(12) United States Patent
Ebner et al.

(10) Patent No.: US 8,682,401 B2
(45) Date of Patent: Mar. 25, 2014

(54) ACTIVATION OF THE RECEPTION READINESS OF AN IN-VEHICLE NETWORK

(75) Inventors: André Ebner, Ingolstadt (DE); Roman Ranzinger, Eichstätt (DE)

(73) Assignee: Audi AG, Ingolstadt (DE)

( * ) Notice: Subject to any disclaimer, the term of this patent is extended or adjusted under 35 U.S.C. 154(b) by 610 days.

(21) Appl. No.: 11/802,972

(22) Filed: May 29, 2007

(65) Prior Publication Data
US 2008/0045168 A1 Feb. 21, 2008

(30) Foreign Application Priority Data
May 26, 2006 (DE) .......................... 10 2006 024 634

(51) Int. Cl.
*H04M 1/00* (2006.01)

(52) U.S. Cl.
USPC ....... 455/574; 455/152.1; 455/13.4; 455/572; 455/343.5; 370/311; 370/338

(58) Field of Classification Search
USPC .......... 455/13.4, 522, 572–574, 127.1–127.5, 455/343.1–343.6, 345, 403, 152.1; 370/311, 338, 389; 340/988
See application file for complete search history.

(56) References Cited

U.S. PATENT DOCUMENTS

| | | | | |
|---|---|---|---|---|
| 6,037,675 A | * | 3/2000 | Yoshida et al. .............. | 307/10.2 |
| 6,917,801 B2 | * | 7/2005 | Witte et al. .................... | 455/418 |
| 7,100,203 B1 | * | 8/2006 | Tosey ............................... | 726/17 |
| 7,254,725 B2 | * | 8/2007 | Forstl ............................. | 713/320 |
| 7,664,479 B2 | * | 2/2010 | Fischer et al. ............. | 455/343.2 |
| 2002/0105443 A1 | * | 8/2002 | Flick .............................. | 340/988 |
| 2002/0107010 A1 | * | 8/2002 | Witte et al. .................... | 455/418 |
| 2002/0197955 A1 | * | 12/2002 | Witkowski et al. ............. | 455/41 |
| 2003/0053433 A1 | * | 3/2003 | Chun ............................. | 370/338 |
| 2004/0077383 A1 | * | 4/2004 | Lappetelainen et al. ...... | 455/574 |
| 2004/0127206 A1 | * | 7/2004 | Van Bosch et al. ........... | 455/418 |
| 2006/0100002 A1 | * | 5/2006 | Luebke et al. ................. | 455/574 |
| 2006/0152090 A1 | * | 7/2006 | Hubert et al. ................. | 307/140 |
| 2007/0015485 A1 | * | 1/2007 | DeBiasio et al. ............. | 455/345 |
| 2007/0057809 A1 | * | 3/2007 | Su ............................ | 340/825.69 |
| 2007/0060056 A1 | * | 3/2007 | Whitaker et al. ............ | 455/41.2 |
| 2007/0096938 A1 | * | 5/2007 | Lopez et al. ............. | 340/825.69 |
| 2007/0135087 A1 | * | 6/2007 | Villevieille et al. ........... | 455/403 |
| 2009/0067367 A1 | * | 3/2009 | Buracchini et al. ........... | 370/328 |

FOREIGN PATENT DOCUMENTS

| | | | |
|---|---|---|---|
| DE | 10137723 | 2/2003 | |
| DE | 102005027018 | 6/2005 | |
| EP | 2003/011616 | 10/2003 | |
| JP | 2003152737 | 5/2003 | |
| WO | 2004/004208 | 1/2004 | |
| WO | WO 2006045335 A1 * | 5/2006 | .............. H04Q 7/32 |

* cited by examiner

*Primary Examiner* — Junpeng Chen
(74) *Attorney, Agent, or Firm* — Staas & Halsey LLP

(57) ABSTRACT

The subject matter of the invention is a process and a system for wireless transmission of infotainment components between an in-vehicle network in a vehicle and a network external to the vehicle, the in-vehicle network having a reception readiness state and an idle state and by way of a remote control of the vehicle can be shifted from the idle state to the reception readiness state. Furthermore the invention relates to a remote control for transmission of a prompt signal, the in-vehicle network by actuating an actuating element of the remote control shifting the in-vehicle network into the reception readiness state, by which infotainment components can be received from a network external to the vehicle.

24 Claims, 1 Drawing Sheet

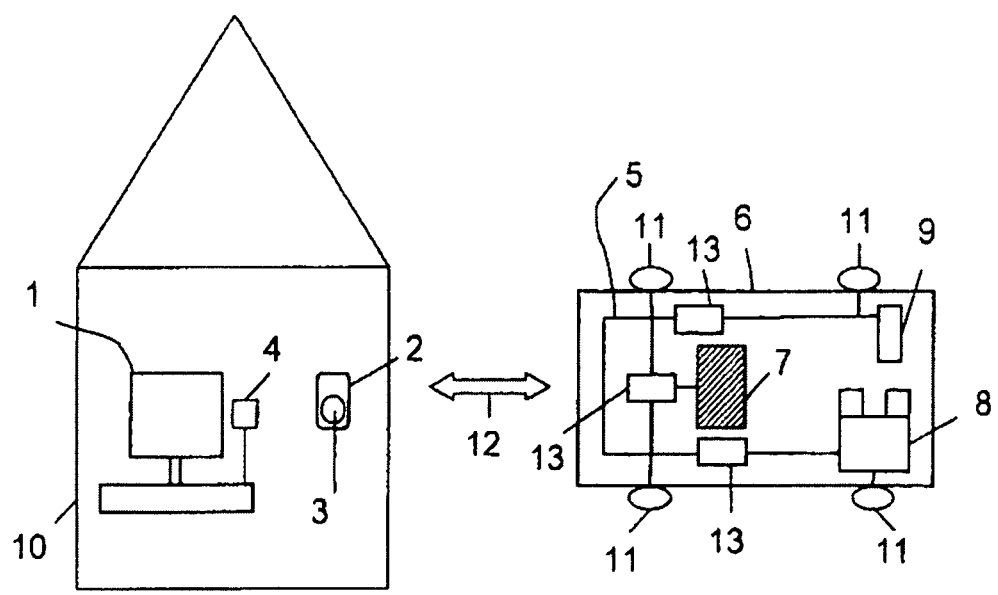

ACTIVATION OF THE RECEPTION READINESS OF AN IN-VEHICLE NETWORK

CROSS-REFERENCE TO RELATED

This claims priority from DE 10 2006 024 634.9, having been filed on May 26, 2006, hereby incorporated by reference in its entirety.

BACKGROUND

1. Field

This invention relates to a process for activation of the reception readiness of an in-vehicle network, a remote control unit for activation of the reception readiness, and further a system for transmission of infotainment components.

More and more devices and laptops, PDAs and home networks are already able to communicate with one another over wireless local area networks. Furthermore, integration of the technology of wireless networks, especially WLAN, in the vehicle, and enabling communication between vehicles and between a vehicle and external networks are planned for future generations of motor vehicles.

2. Description of the Related Art

In DE 101 37 723 A1 there are radio interfaces at suitable locations which make available a series of stored data. The data stored in the radio interface can be interrogated for example by multimedia terminals in a motor vehicle over these radio interfaces, transmitted to the multimedia device and stored. The data stored in the terminal can then be reproduced in the vehicle.

Furthermore a system for communication between a home computer and a vehicle computer via radio is known from US Patent 2003/0053433 A1. A WLAN access point is installed for example in the garage and if the vehicle is driving into the garage, a link between the WLAN access point and a vehicle-side access point is automatically established, over which data can be transmitted.

Since the vehicle is connected immediately to the WLAN access point after returning home, the vehicle-side network is always ready; this heavily burdens the vehicle battery.

Furthermore, this permanent reception readiness of the vehicle-side network increases the opportunity for third parties to gain unauthorized access to vehicle data.

BRIEF SUMMARY OF THE INVENTION

Therefore the object of this invention is to further develop a process of the initially mentioned type such that the aforementioned disadvantages are surmounted.

The subject matter of the invention is a process for wireless transmission of infotainment components between an in-vehicle network in a motor vehicle and a network external to the vehicle, the in-vehicle network having a reception readiness state and an idle state and by way of a remote control the vehicle can be shifted from the idle state to the reception readiness state.

Furthermore there is a remote control of the vehicle for transmission of a prompt signal, the vehicle being equipped with a network which has a reception readiness state and an idle state, the remote control activating the in-vehicle network by actuating an actuating element of the remote control, so that it is shifted into the reception readiness state and can receive infotainment components from a network external to the vehicle.

Furthermore there is also a system for transfer of infotainment components, the system containing the following components: an in-vehicle network in a motor vehicle, the in-vehicle network having a reception readiness state and an idle state, a network external to the vehicle and a remote control for the vehicle, characterized in that the remote control activates the in-vehicle network when the actuating element of the remote control is actuated so that it is shifted into the reception readiness state, the network external to the vehicle being able to connect to the in-vehicle network in order to enable transmission of infotainment components.

In this invention it is especially advantageous for the in-vehicle network to be shifted into a reception readiness state only at short, fixed times which are defined for example by the driver. This saves the battery and furthermore minimizes the risk of unauthorized access.

The network external to the vehicle can be for example a wireless home network, a computer, a PDA, a laptop, a network or a computer in another vehicle, in a business, for example a shop, computers or networks in the infrastructure, etc. Transmission from a device as mentioned above or network takes place preferably by way of the WLAN standard, but can also take place over the Bluetooth, HiperLAN, ZigBee, nanoNET, Wireless-USB standards or any other wireless connection. But connections which take place via for example radio, RF or infrared are preferred.

Remote control of the central locking system of the motor vehicle is advantageous. One important advantage of this embodiment is that technical components located in the motor vehicle can be used, and that the need for additional transmitter/receiver units is eliminated.

The in-vehicle network is shifted into the reception readiness state for example by actuating an actuation element of the remote control, for example a locking element of the remote control. After actuating this element the in-vehicle network, for example a WLAN, is shifted into the reception readiness state for a fixed time interval. Shifting into the reception readiness state can take place for example via a prompt signal which is relayed to the in-vehicle network by way of the central locking control device or by way of another control device which is connected to the remote control.

When the in-vehicle network is ready to receive, the network external to the vehicle can be connected to the in-vehicle network and can be authenticated relative to the in-vehicle network. Upon successful authentication the in-vehicle network remains on in order to enable access from the external network over a longer time.

If a network external to the vehicle is not authenticated relative to the in-vehicle network within a first fixed time interval, the in-vehicle network will undergo transition again into the idle state.

Likewise a connection between the in-vehicle network and the network external to the vehicle after a second fixed time interval again undergoes transition into the idle state when the connection is inactive, i.e., when for example no data have been transmitted in a second fixed time interval.

The in-vehicle network advantageously comprises a transmitter/receiver which takes over communication with the network external to the vehicle when the in-vehicle network has been shifted into the reception readiness state. Advantageously the transmitter/receiver is supplied by way of a conventional vehicle battery.

To prevent the vehicle battery from being discharged during communication with the network external to the vehicle, the vehicle advantageously furthermore comprises a battery management system which is connected to the vehicle battery and which monitors the battery voltage of the vehicle battery. When a low operating voltage is reached, the transmitter/receiver is automatically turned off.

Provision is preferably made such that the in-vehicle network is shifted into the operational state when the ignition is turned on. It is furthermore provided that turning off the ignition, removing the ignition key or locking the vehicle shifts the in-vehicle network into the idle state after a first fixed time interval.

The infotainment components can be any media data as well as audio, video and/or multimedia data, text-based data, navigation data and navigation routes, etc.

In one especially advantageous embodiment the in-vehicle network and the network external to the vehicle are wireless LAN networks (WLAN) and the network external to the vehicle is a home network. In this embodiment infotainment components can then be transmitted from a home PC to the vehicle. Applications are for example matching of media data with the home network so that when the vehicle is parked in the garage or in front of the house, for example music data such as MP3 music data can be transmitted wirelessly from the home PC to the vehicle and/or erased.

Another possible application is the planning of navigation routes comfortably at home with subsequent wireless transmission of the route to the vehicle navigation system.

Preferably the system furthermore comprises a vehicle-side transmitter/receiver for receiving information over the wireless network, the transmitter/receiver being connected to the in-vehicle network. Furthermore a transmitter/receiver is also connected to the network external to the vehicle.

BRIEF DESCRIPTION OF THE DRAWING

Other advantages and details of the invention will become apparent from the embodiment described below and with the aid of the drawings.

FIG. 1 shows one embodiment of the system according to the invention for activation of a reception readiness state in a schematic.

DETAIL DESCRIPTION OF THE INVENTION

In order to be able to transmit media data and/or infotainment data between a home computer 1 and a vehicle 6, a wireless WLAN network is installed both in the vehicle 6 and also at home or in a building 10. It is already known that a computer 1 is wirelessly connected to the telecommunications provider via a WLAN network. FIG. 1 shows in a schematic a system in which data can be transmitted. The computer 1 is in a building 10 and is connected to the network provider by a transmitter/receiver 4 wirelessly, by radio or infrared, by means of the WLAN standard, for example. The transmitter/receiver 4 can be a network card, can be coupled via the USB connection, or can be connected to the computer 1 via a cable link. Infotainment data can be stored and played on the computer 1. To be able to play media and infotainment data in the vehicle 6 as well, the vehicle 6 is equipped with at least one media device 7. The media device 7 is connected to the vehicle electrical system 5 and to a WLAN network in the vehicle 6. Other components and other control devices 13 are connected to the vehicle electrical system 5. A transmitter/receiver 9 of the WLAN network provides for the link 12 to the network external to the vehicle in the building 10.

The vehicle electrical system 5 and all devices 9, 13, 7 connected to it are supplied by the battery 8.

Furthermore the vehicle 6 is equipped with a central locking system 11 which is likewise connected to the vehicle electrical system 5. The central locking system 11 is operated via a remote control 2. It is provided according to the invention that by actuating the actuating element 3 of the remote control 2, preferably a lock actuating element, a prompt signal is transmitted to the WLAN network in the vehicle. The prompt signal will shift the in-vehicle network into the reception readiness state. The in-vehicle network is therefore shifted into the activated state or data transmission mode, and the network external to the vehicle can be authenticated by the transmitter/receiver 4 relative to the in-vehicle network via the transmitter/receiver 9. After successful authentication, the two networks 7, the network external to the vehicle and the in-vehicle network 1, are connected and infotainment data can be transmitted by the link 12.

The invention claimed is:

1. A system for wireless transmission of infotainment components between an in-vehicle network in a vehicle and a network external to the vehicle, the system comprising
an in-vehicle network having
a reception readiness state in which the in-vehicle network is ready to receive information from the network external to the vehicle, and
an idle state in which the in-vehicle network is not ready to receive information from the network external to the vehicle,
wherein the in-vehicle network is shifted into the reception readiness state when an ignition of the vehicle is activated,
wherein the in-vehicle network is shifted into the idle state after the ignition of the vehicle is deactivated,
wherein the in-vehicle network is shifted into the idle state after at least one door of the vehicle is locked,
wherein, by way of a remote control, the in-vehicle network can be shifted from the idle state to the reception readiness state,
wherein upon entering the reception readiness state, the in-vehicle network transitions back to the idle state, unless authenticated to the network external to the vehicle within a first fixed time interval,
wherein once authenticated to the network external to the vehicle, the in-vehicle network transitions back to the idle state if no data is transmitted for a second fixed time interval, and
wherein the vehicle contains a vehicle battery and a battery management system which is connected to it, which monitors the battery voltage of the vehicle battery and automatically turns off the transmitter/receiver when the battery voltage reaches a low battery voltage.

2. The system according to claim 1, wherein the remote control is that of a central locking system of the vehicle.

3. A process comprising shifting the in-vehicle network of the system of claim 2 into the reception readiness state by actuating an actuation element of the remote control.

4. The system according to claim 1, wherein the network external to the vehicle can be connected to the in-vehicle network and can be authenticated relative to the in-vehicle network when the in-vehicle network is ready to receive.

5. A process comprising shifting the in-vehicle network of claim 1 into the reception readiness state for a third fixed time interval.

6. The system of claim 1, wherein a transmitter/receiver of the in-vehicle network is supplied via vehicle battery.

7. The system according to claim 1, wherein the in-vehicle network and/or the network external to the vehicle are wireless LAN networks.

8. The system according to claim 1, wherein the network external to the vehicle is a home network, and wherein infotainment data can be transmitted from a computer to the vehicle.

9. The system according to claim 8, wherein the infotainment components are media data as well as audio, video and/or multimedia data, and/or navigation data, as well as navigation routes.

10. The system according to claim 1, wherein the in-vehicle network is shifted into the idle state after the ignition of the vehicle is deactivated, after a predetermined time interval, beginning from the time when the ignition of the vehicle is deactivated.

11. The system according to claim 1, wherein the in-vehicle network is shifted into the idle state when after at least one door of the vehicle is locked, after a predetermined time interval, beginning from the time when the at least one door of the vehicle is locked.

12. A method of remotely controlling a motor vehicle for transmission of a prompt signal, the vehicle comprising an in-vehicle network having a reception readiness state and an idle state, the method comprising:
   operating the remote control to activate the in-vehicle network by actuating an actuating element of the remote control so that it is shifted into the reception readiness state and is configured to receive infotainment components from a network external to the vehicle,
   wherein upon entering the reception readiness state, the in-vehicle network transitions back to the idle state, unless authenticated to the network external to the vehicle within a first fixed time interval,
   wherein once authenticated to the network external to the vehicle, the in-vehicle network transitions back to the idle state if no data is transmitted for a second fixed time interval, and
   wherein the in-vehicle network is shifted into the idle state after the ignition of the vehicle is deactivated or after at least one door of the vehicle is locked,
   wherein the reception readiness state is a state in which the in-vehicle network is ready to receive information from the network external to the vehicle, and the idle state is a state in which the in-vehicle network is not ready to receive information from the network external to the vehicle.

13. A system for transmission of infotainment components, the system comprising:
   an in-vehicle network in a motor vehicle, the in-vehicle network having a reception readiness state in which the in-vehicle network is ready to receive information from a network external to the vehicle and an idle state in which the in-vehicle network is not ready to receive information from the network external to the vehicle, and a remote control for the vehicle, wherein the remote control activates the in-vehicle network when the actuating element of the remote control is actuated so that it is shifted into the reception readiness state, and can receive infotainment components from the network external to the vehicle,
   wherein once authenticated to the network external to the vehicle, the in-vehicle network transitions back to the idle state if no data is transmitted for a fixed time interval,
   wherein the in-vehicle network is shifted into the idle state after the ignition of the vehicle is deactivated or after at least one door of the vehicle is locked.

14. The system according to claim 13, wherein the system furthermore comprises a vehicle-side transmitter/receiver for receiving information over the wireless network, the transmitter/receiver being connected to the in-vehicle network, and contains another transmitter/receiver which is connected to a network external to the vehicle.

15. The system according to claim 13, further comprising a network external to the vehicle.

16. A method of operating an in-vehicle network inside a motor vehicle comprising:
   receiving a signal to switch the in-vehicle network from an idle state to reception readiness state;
   operating a transmitter/receiver connected to the in-vehicle network to communicate with an external network, wherein the external network is outside the vehicle; and
   authenticating the external network to the in-vehicle network prior to transmitting data therebetween, wherein once authenticated to the external network, the in-vehicle network transitions back to the idle state if no data is transmitted for a first predetermined period of time,
   wherein the in-vehicle network is shifted into the idle state after the ignition of the vehicle is deactivated,
   wherein the in-vehicle network is shifted into the idle state after at least one door of the vehicle is locked,
   wherein the reception readiness state is a state in which the in-vehicle network is ready to receive information from the external network, and the idle state is a state in which the in-vehicle network is not ready to receive information from the external network.

17. The method of claim 16, further comprising returning the in-vehicle network to the idle state after a second predetermined period of time.

18. The method of claim 16, further comprising generating the signal with a remote control outside the vehicle.

19. The method of claim 16, wherein the operating comprises transmitting multimedia files.

20. The method of claim 17, wherein the second predetermined period of time can be specified by a driver of the motor vehicle.

21. A system for transferring data to and from an in-vehicle network comprising:
   a vehicle;
   an in-vehicle network located in the vehicle;
   means for switching the in-vehicle network from an idle state to a reception readiness state; and
   means for transferring data between the in-vehicle network and an external network, wherein the vehicle contains a vehicle battery and a battery management system which is connected to it, which monitors the battery voltage of the vehicle battery and automatically turns off the means for transferring data when the battery voltage reaches a low battery voltage,
   wherein the in-vehicle network is shifted into the idle state after the ignition of the vehicle is deactivated,
   wherein the in-vehicle network is shifted into the idle state after at least one door of the vehicle is locked,
   wherein the reception readiness state is a state in which the in-vehicle network is ready to receive information from the external network, and the idle state is a state in which the in-vehicle network is not ready to receive information from the external network.

22. The system of claim 21, wherein the switching means comprises a remote control.

23. The system of claim 21, wherein the transferring means comprises a device capable of operating by way of the WLAN, Bluetooth, HiperLAN, ZigBee, nanoNET and Wireless-USB standards.

24. The system of claim 21, further comprising:
   a timer, actuated by switching of the in-vehicle network to the reception readiness state; and means for returning the in-vehicle network to the idle state upon expiration of a preset amount of time.

\* \* \* \* \*